United States Patent [19]

Brandschain

[11] 4,406,476
[45] Sep. 27, 1983

[54] VEHICLE LIFTING AND TOWING APPARATUS

[76] Inventor: Daniel B. Brandschain, 1029 Thrush La., Huntingdon Valley, Pa. 19006

[21] Appl. No.: 281,020

[22] Filed: Jul. 6, 1981

[51] Int. Cl.³ .............................................. B60P 3/12
[52] U.S. Cl. .................................... 280/402; 414/563
[58] Field of Search ....................... 280/402; 414/563; 293/117; 212/182, 186

[56] References Cited

U.S. PATENT DOCUMENTS

| | | | |
|---|---|---|---|
| 3,430,789 | 3/1969 | Nelson | 414/563 |
| 3,593,865 | 7/1971 | Moor et al. | 280/402 |
| 3,721,356 | 3/1973 | McNeill | 280/402 |
| 4,201,399 | 5/1980 | Carr et al. | 280/402 |
| 4,265,463 | 5/1981 | Perruso | 280/402 |

FOREIGN PATENT DOCUMENTS 238144  3/1962  Australia .............................. 280/402

Primary Examiner—John A. Pekar
Assistant Examiner—D. Lynn Fugate
Attorney, Agent, or Firm—Robert C. Podwil

[57] ABSTRACT

Vehicle lifting and towing apparatus utilizes a pair of frames, each pivotably mounted to a vehicle, and having their distal ends interconnected by cable means. In one embodiment, rotation of one frame causes rotation of the other. In that embodiment, a winch remote from the frames is coupled to one of the frames, so that winching of the winch cable causes both frames to rotate about their respective axes. Means are provided in association with the other of the frames to secure that frame to a vehicle to be towed. In another embodiment, one frame is fixed in a generally vertical orientation, and a winch is mounted on that frame. The second frame is caused to rotate by operation of the winch.

2 Claims, 4 Drawing Figures

VEHICLE LIFTING AND TOWING APPARATUS

BRIEF SUMMARY OF THE INVENTION

This invention relates to vehicle lifting and towing apparatus, and more particularly, to apparatus suitable for use in towing disabled vehicles.

In conventional apparatus of this sort, a towing vehicle, often referred to as a "wrecker", is provided with a hoisting or lifting mechanism in the form of a vertical mast and horizontally extending boom. The mast and boom provide a means for guiding a winch cable, and provide a point from which the cable and an associated hook may be suspended, to provide vertically directed forces at the rear of the towing vehicle. As is illustrated in U.S. Pat. No. 3,430,789, issued Mar. 4, 1969, to A. W. Nelson, and U.S. Pat. No. 4,201,399, issued May 6, 1980, to Carr et al, the winch cable (or in the case of the latter patent, cables) may be associated with a towbar, which controls the longitudinal position of the towed vehicle with respect to the towing vehicle, keeping the towed vehicle at a desired distance from the towing vehicle.

The present invention is directed to lifting and towing apparatus which eliminates the need for the familiar wrecker boom, yet provides lifting forces through a unique arrangement of mechanically simple elements, operating in association with a power or hand-operated winch. One present form of the apparatus utilizes a pair of frames, each pivotably mounted at or adjacent the rear of the towing vehicle, and having their distal ends linked so that rotation of one causes rotation of the other. A winch, mounted on the towing vehicle remote from the frames (but at a location which is not critical) has a winch cable coupled to one of the frames, so that winching in of the cable causes that frame to rotate, and through the medium of the connection to the other frame, causes the other frame to rotate as well. Means are provided in association with the other of the frames to secure that frame to a vehicle to be towed. Thus, winching in of the winch cable causes lifting of the towed vehicle.

In an alternative form of the present invention, the first frame is maintained in a fixed upright position by supporting cables, and the winch is mounted on the frame. The winch cable, in this embodiment, extends to a distal end of the second frame, so that winching in of the cable causes rotation of the second frame and lifting of the towed vehicle.

Accordingly, it is an object of this invention to provide a mechanically simple and relatively inexpensive apparatus, capable of lifting and towing a vehicle without the need for a wrecker boom. In another of its aspects, it is an object of this invention to provide a novel vehicle lifting and towing apparatus which may be readily adapted to existing vehicles, such as pick-up trucks, without major structural modification of them, and without the need for expensive and highly specialized equipment, such as a wrecker boom. Other objects will appear hereinafter.

The foregoing and other objects of this invention are realized, in a presently preferred form of the invention, by apparatus which comprises a first frame pivotably mounted adjacent the rear of the vehicle for pivoting about a generally horizontal axis, and a second frame, also mounted for pivoting about a generally horizontal axis. The first frame, in its range of normal usage, has an arc of movement which takes it through the vertical. The second frame, in its normal usage, has an arc of movement which takes it through the horizontal. Distal ends of the first and second frames are linked together, by a cable, so that the second frame is caused to pivot in response to pivoting of the first frame. A winch mounted on the bed of a pick-up truck or on a chassis member beneath the bed provides the means for moving the first frame. Winching in of a cable associated with the winch causes rotation of the first frame and the second frame, and lifting of the distal end of the second frame. A sling, chains, or other means, may be provided to secure the towing apparatus to a vehicle to be towed.

In another embodiment of the present invention, the first frame is maintained in a generally vertical orientation, but a winch is mounted at a distal end of the frame, above the chassis of the towing vehicle. The winch cable associated with the frame-mounted winch is secured to a distal end of the second frame, so that winching in of the cable causes the second frame to move through a range of movement which takes it through the horizontal. As before, a sling, chains or other means are provided to secure the distal end of the second frame to a vehicle to be towed.

For the purpose of illustrating the invention, there are shown in the drawings forms of the invention which are the best mode presently contemplated for carrying out the invention, it being understood, however, that the invention is not limited to the precise arrangements and instrumentalities shown.

DETAILED DESCRIPTION

Figure 1:
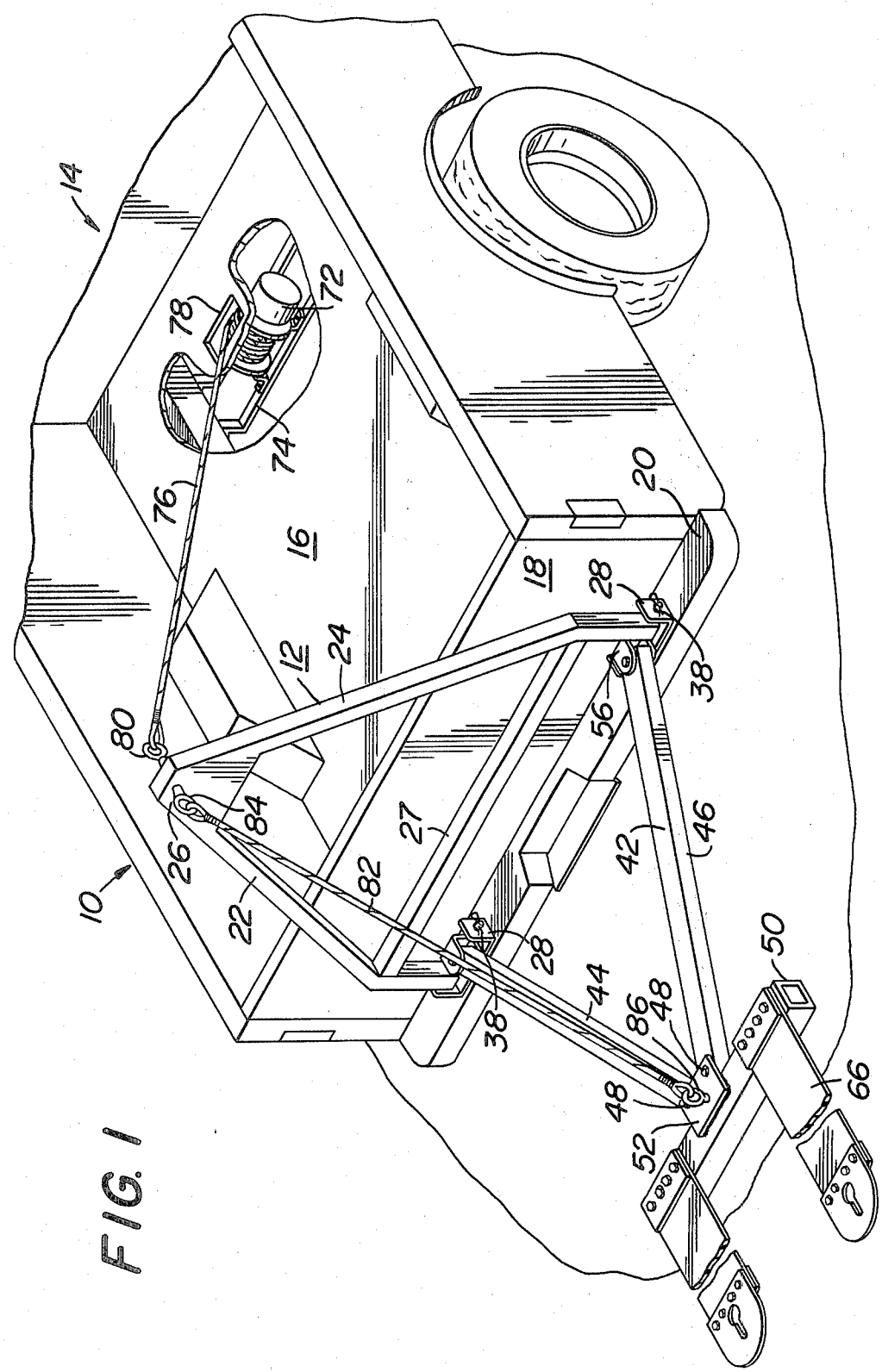
FIG. 1 is a perspective view of an embodiment of towing and lifting apparatus in accordance with the present invention.

Referring now to the drawings in detail, wherein like reference numerals indicate like elements, there is seen in FIG. 1 vehicle lifting and towing apparatus designated generally by the reference numeral 10. The lifting and towing apparatus comprises a first frame 12 pivotably mounted on a vehicle designated generally by the reference numeral 14. The rear end of the vehicle, a pick-up truck in this instance, is seen in FIG. 1.

The illustrated FIG. 14 includes a flat bed 16, a tailgate 18 and a bumper 20.

The frame 12 in the illustrated form of the invention is generally "A"-shaped, and includes a pair of legs 22 and 24, the lower portions of which are pivotably secured to the bumper 20, and the upper portions of which converge at their distal ends to form a vertex 26. A cross-piece 27 interconnects an intermediate portion of the legs 22 and 24.

Figure 4:
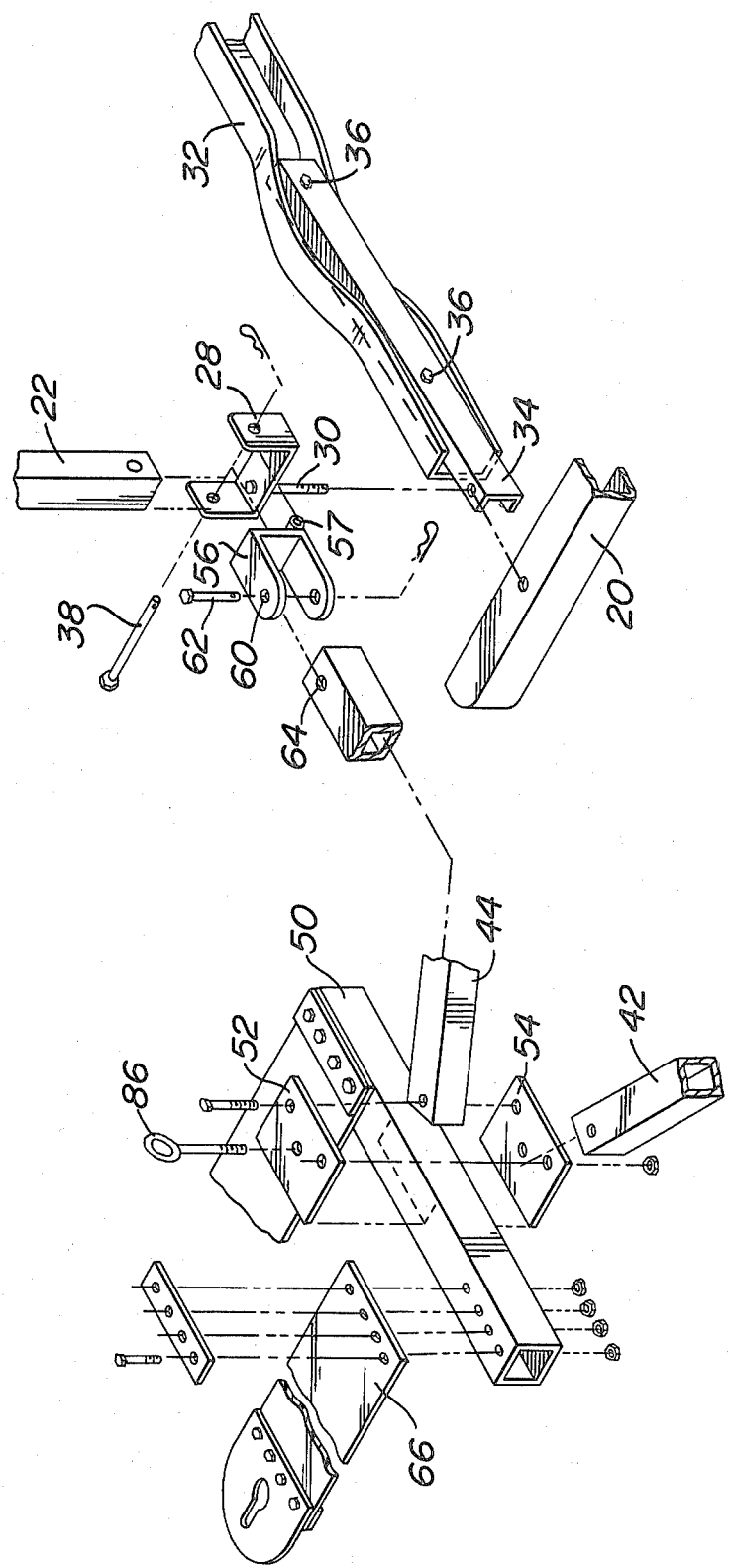
FIG. 4 is a detailed view, showing in exploded form certain mechanical details of the present invention.

Referring now to FIGS. 1 and 4, respective ends of the legs 22 and 24 are secured to the bumper 20 by means of generally U-shaped brackets 28, secured to the bumper 20. Securement of the brackets 28 to the bumper 20 is preferably accomplished by means of bolts 30, one of which is seen in FIG. 4, although other means may be used if desired.

Referring to FIG. 4, the bumper 20 is itself secured to the chassis frame rails 32 of the vehicle 14 (one of which is seen in FIG. 4) by mounting channels 34. The above-mentioned bolts 30 may serve the double function of securing the brackets 28 to the bumper 20 as well as securing the bumper 20 to the mounting channels 34. Bolts 36 may secure the mounting channels 34 to the chassis frame rail 32. In a presently preferred form of the apparatus 10, the legs 22 and 24 of the frame 12 are secured to the bracket 28 by quick release pins 38, removal of which facilitates removal of the frame 12 from the vehicle 14.

Referring once again to FIG. 1, a second frame 42 is also pivotably secured to the vehicle 14. The frame 42 consists of legs 44 and 46, ends of which are connected, in a manner which will be described below, to the brackets 28. The legs 44 and 46 converge at their distal ends, and are there secured to means for securing the apparatus 10 to a vehicle to be towed. In this regard, referring now to FIGS. 1 and 4, bolts 48 pass through mounting plates 52 and 54, welded or otherwise secured to a cross-beam 50, as well as aligned apertures in the legs 44 and 46.

Referring now to FIGS. 1 and 4, other ends of the legs 44 and 46 are received in clevises 56, one of which is seen in FIG. 4. The clevises 56 provide a generally horizontally disposed bore 57, through which the above-described quick release pins 38 may pass to provide horizontal pivot axes for the legs 44 and 46 and the frame 42. The clevises 56 also provide generally vertically aligned bores 60, which may receive quick release pins 62. The quick release pins 62 are adapted to pass through vertically aligned apertures 64 in the legs 44 and 46 to secure the legs 44 and 46 to the clevises 56.

It should be apparent from FIG. 1 that the arrangement of the legs 44 and 46, the mounting plates 52 and 54, and the clevises 56 allows for a limited parallelogram movement of the frame 42 in the plane of the legs 44 and 46, thus accommodating minor misalignment between the vehicle 14 and a vehicle to be towed.

Towing slings 66 are secured to the cross-beam 50, and may be coupled to the frame of a towed vehicle 68 by means of chains 70 (as appears in FIG. 2), in a conventional manner.

Referring now to FIG. 1, a winch 72 is mounted, in the illustrated form of the invention, on frame work 74 beneath the flat bed 16 of the towing vehicle 14. The winch 72 may, if desired, be mounted above the flat bed. The winch cable 76 associated with the winch 72, in the illustrated embodiment, passes through an aperture 78 in the flat bed 16 and is secured to an eye 80, affixed near the vertex 26 of the frame 12. A cable 82 extends from another eye 84 secured to the vertex 26 to an eye 86, secured in the illustrated embodiment to the mounting plate 52 associated with the cross-beam 50.

Figure 2:
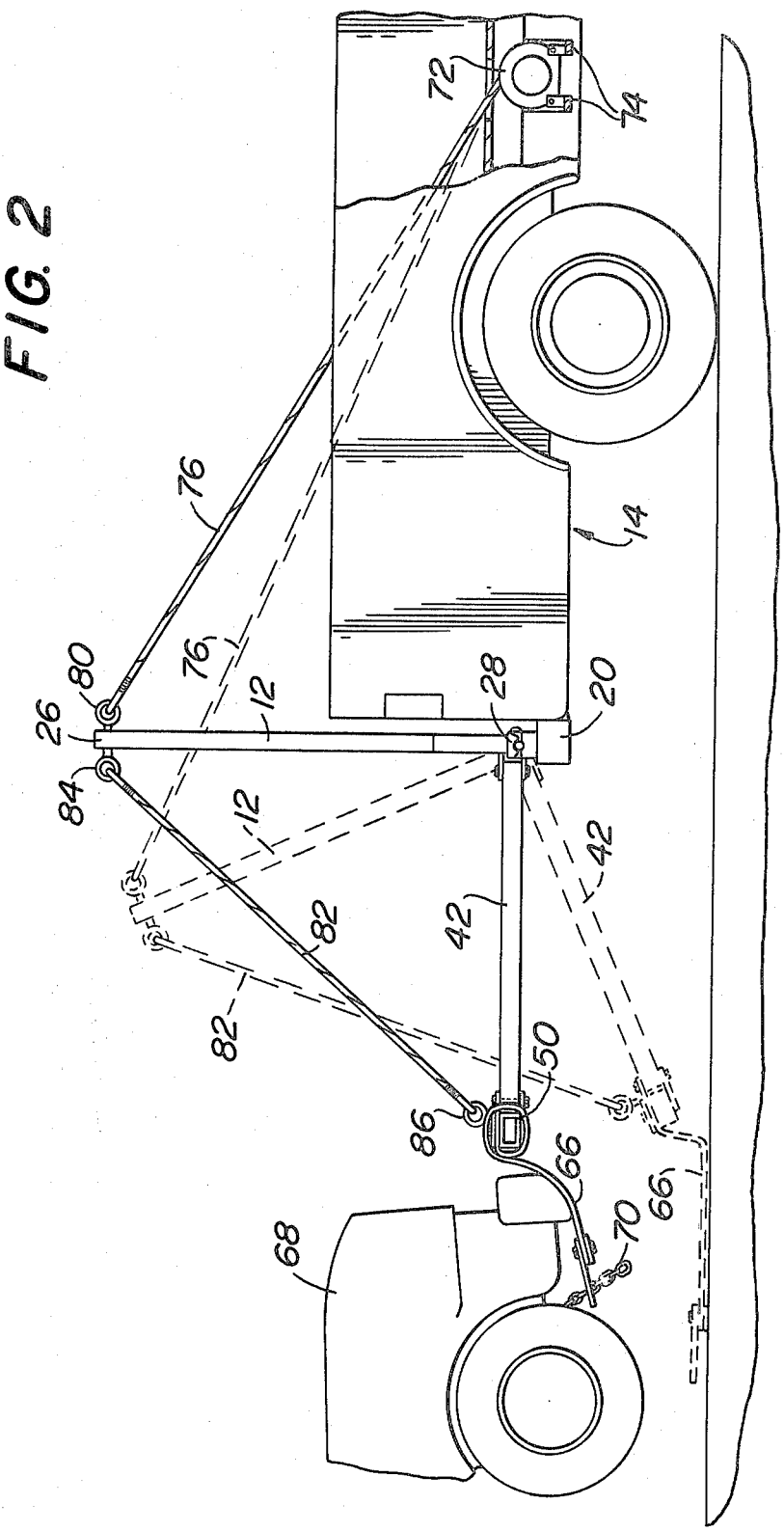
FIG. 2 is a side elevational view, showing in dotted lines operation of the embodiment shown in FIG. 1.

It should now be apparent that in the embodiment of the invention illustrated in FIGS. 1 and 2, winching in of the cable 76 will cause rotation of the frame 12 from approximately the dotted line position in FIG. 2 to the solid line position. Such movement of the frame 12, causes tensioning of the cable 82 and movement of the frame 42 to approximately the solid line position in FIG. 2.

The towing sling 66, as is conventional, consists of a sling of belting materials, which is wrapped around the cross-beam 50 and secured by the chain 70. In a well-known manner, the bumper of the towed vehicle 68 is drawn, upon lifting of the frame 42, into close contact with the cross-beam 50, and buffered from direct contact by the slings 66.

Figure 3:
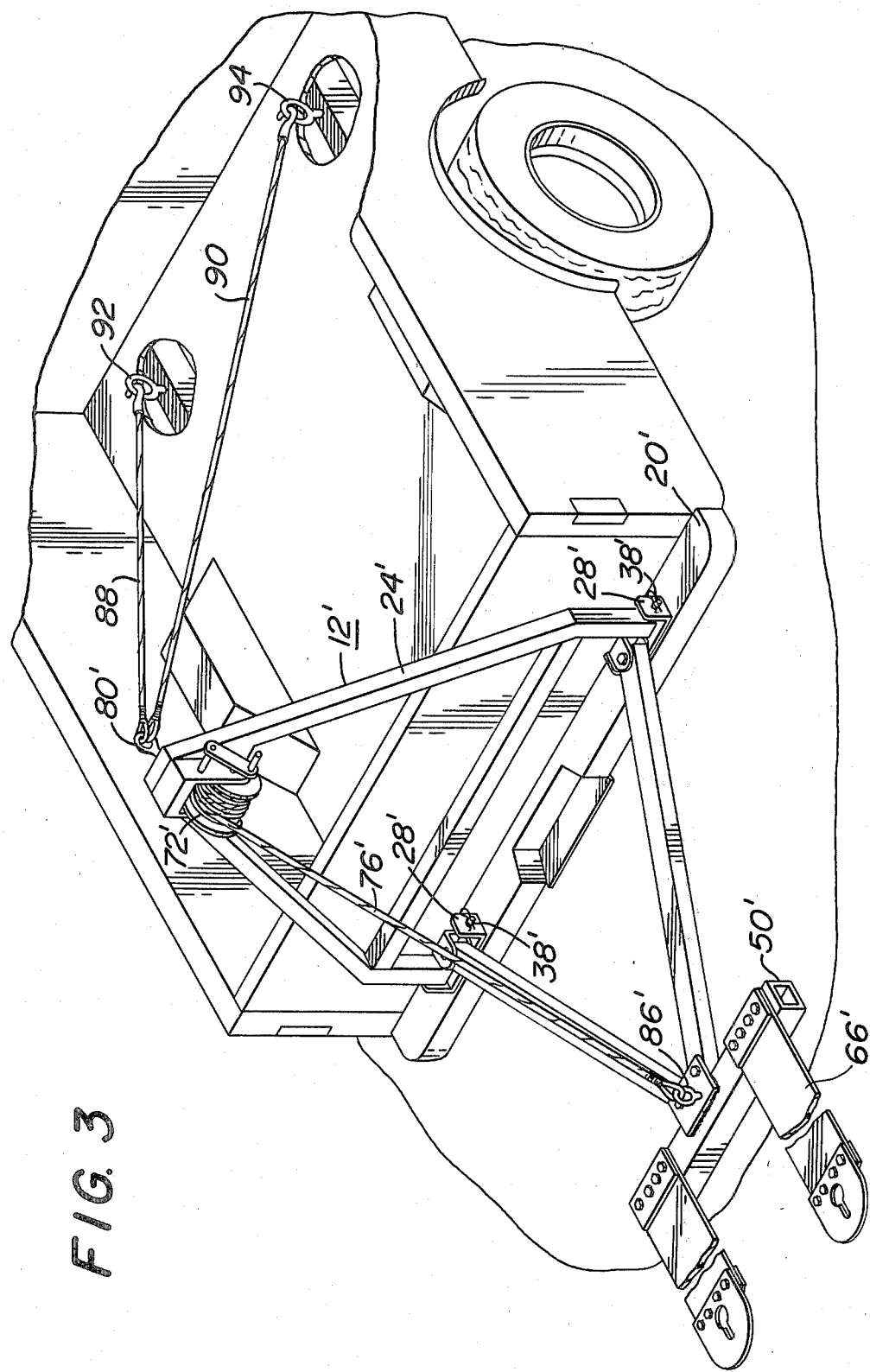
FIG. 3 is a perspective view of another embodiment of towing apparatus in accordance with the present invention.

Referring now to FIG. 3, there is seen an alternative form of the apparatus, wherein elements corresponding to those previously described are indicated by like primed reference numerals. In this alternative embodiment, the frame 12' is held in a fixed, generally vertical orientation by a pair of guy cables 88, 90, having respective ends secured to an eye 80' and a pair of fixed eyes 92 and 94 secured to the chassis of the towing vehicle 14.

A winch 72', preferably provided with reduction gearing to facilitate hand operation, is mounted at the vertex of the frame 12'. Its cable 76' is secured to an eye 86' associated with the cross-beam 50' of the frame In operation of the embodiment of the invention shown in FIG. 3, the vehicle to be towed (not shown) is maneuvered into position behind the towing vehicle 14', the towing slings 66' are secured to its chassis in the manner described above, and the winch 72' is operated to cause upward rotation of the frame 42' and hence lifting the towed vehicle. With the frame 42' in an approximately horizontal position, the towed vehicle is secured to the towing vehicle 14' in the same manner as described in connection with the above embodiment.

The present invention provides a mechanically simple, inexpensive and relatively trouble free alternative to the conventional wrecker structure.

Moreover, referring to FIG. 3, although the frames 12, 12', 42 and 42' prime are shown associated with a bumper 20, 20', an often desired arrangement, it should be apparent to those skilled in the art that the apparatus can be mounted on other suitably secure vehicle structure. The arrangement illustrated in FIG. 4, wherein the mounting channel 34 extends forwardly from the bumper 20 to the vicinity of the kick-up of the chassis frame rail 32 of the towing vehicle 14, provides a particularly strong and rigid structural arrangement, which, with proper selection of the dimensions of the mounting channel 34, may be adapted to most if not all commercially available pick-up trucks.

It should now be apparent that the present apparatus may readily be fitted to existing vehicles, such as pick-up trucks, to adapt such vehicles to the lifting and towing role. The apparatus, however, may just as readily be removed, to leave the vehicle free for other usage.

The present invention may be embodied in other specific forms without departing from its spirit or essential attributes, and, accordingly, reference should be made to the appended claims rather than the foregoing specification as indicating the scope of the invention.

I claim:

1. Vehicle lifting and towing apparatus comprising first generally vertical frame means, second generally horizontal frame means, a bumper secured to the rear of the towing vehicle, a pair of spaced brackets coupled to said bumper, said first and second frame means having respective portions thereof pivotably mounted in said brackets whereby said first and second frame means are pivotably coupled to the rear of the towing vehicle, and vehicle frame-engaging means coupled to the frame of the towing vehicle and to said bumper, said brackets being operatively interconnected with said vehicle frame-engaging means to secure said lifting and towing apparatus to said frame, cable means coupled to the vehicle and to a distal end of said first frame means for supporting said frame means, cable means interconnecting said first and second frame means, winch means operatively coupled to said first and second frame means for lifting said second frame means and a vehicle to be towed, and means coupled to a distal portion of said second frame means for securing said second frame means to a vehicle to be towed.

2. Apparatus in accordance with claim 1, wherein said winch is mounted on said first frame means, and said second-mentioned cable means being operatively associated with said winch so that operation of said winch causes movement of said second frame means.

* * * * *